(12) United States Patent
Hoshino et al.

(10) Patent No.: US 8,271,667 B2
(45) Date of Patent: Sep. 18, 2012

(54) INFORMATION SERVICE COMMUNICATION NETWORK SYSTEM AND SESSION MANAGEMENT SERVER

(75) Inventors: Kazuyoshi Hoshino, Komae (JP); Kazuma Yumoto, Fuchu (JP); Satoshi Kiyoto, Fujisawa (JP); Takashi Miyamoto, Yokohama (JP); Yasunori Saigusa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1138 days.

(21) Appl. No.: 11/086,430

(22) Filed: Mar. 23, 2005

(65) Prior Publication Data

US 2005/0220039 A1 Oct. 6, 2005

(30) Foreign Application Priority Data

Mar. 30, 2004 (JP) ................. 2004-098235

(51) Int. Cl.
*G06F 15/16* (2006.01)
*G06F 15/177* (2006.01)
*G06F 15/173* (2006.01)
*H04L 12/16* (2006.01)

(52) U.S. Cl. ........ 709/229; 709/218; 709/219; 709/220; 709/225; 709/226; 709/227; 709/228; 370/260; 370/261

(58) Field of Classification Search .......... 370/260–261; 709/218, 228, 219, 220, 225, 226, 227, 229
See application file for complete search history.

(56) References Cited

U.S. PATENT DOCUMENTS

| | | | |
|---|---|---|---|
| 4,123,795 A * | 10/1978 | Dean et al. .................. 718/103 |
| 6,515,968 B1 * | 2/2003 | Combar et al. ............... 370/252 |
| 6,714,979 B1 * | 3/2004 | Brandt et al. ................. 709/225 |
| 6,714,987 B1 * | 3/2004 | Amin et al. ................... 709/249 |
| 6,728,962 B1 * | 4/2004 | Chalmer et al. .............. 718/108 |
| 6,775,269 B1 * | 8/2004 | Kaczmarczyk et al. ...... 370/352 |
| 6,854,014 B1 * | 2/2005 | Amin et al. ................... 709/227 |
| 6,865,681 B2 * | 3/2005 | Nuutinen ........................ 726/14 |
| 6,961,334 B1 * | 11/2005 | Kaczmarczyk .............. 370/354 |
| 7,107,348 B2 * | 9/2006 | Shimada et al. ............. 709/229 |
| 7,170,863 B1 * | 1/2007 | Denman et al. .............. 370/260 |
| 7,298,733 B2 * | 11/2007 | Sakai et al. .................. 370/352 |

(Continued)

FOREIGN PATENT DOCUMENTS

JP 2003-108527 4/2003

(Continued)

OTHER PUBLICATIONS

Related Document cited in the "Related Art" of Our Specification 1) Internet Engineering Task Force (IETF) RFC3246.

*Primary Examiner* — Kamal B Divecha
*Assistant Examiner* — Saket K Daftuar
(74) *Attorney, Agent, or Firm* — Antonelli, Terry, Stout & Kraus, LLP

(57) ABSTRACT

A session management server, which is provided with a service determination table having a plurality of entries each indicating a service identifier in association with possible particular items of information which may be extracted from a session setup request packet, receives a session setup request packet issued from a client to a particular application server and determines whether the client terminal is authorized to receive an information service by referring to the determination table, in place of the particular application server. When the determination results in success, the session setup request packet is forwarded to the particular application server.

12 Claims, 21 Drawing Sheets

U.S. PATENT DOCUMENTS

| | | | |
|---|---|---|---|
| 7,424,538 B2 * | 9/2008 | Igarashi et al. | 709/227 |
| 7,703,101 B2 * | 4/2010 | Cuomo et al. | 718/104 |
| 7,724,691 B2 * | 5/2010 | Mela et al. | 370/261 |
| 7,796,520 B2 * | 9/2010 | Poustchi et al. | 370/236 |
| 2002/0010785 A1 | 1/2002 | Katsukawa et al. | |
| 2002/0077994 A1 * | 6/2002 | Dombroski | 705/80 |
| 2002/0143874 A1 * | 10/2002 | Marquette et al. | 709/204 |
| 2003/0009766 A1 * | 1/2003 | Marolda | 725/97 |
| 2003/0012220 A1 * | 1/2003 | Kim et al. | 370/455 |
| 2003/0032411 A1 * | 2/2003 | Kim et al. | 455/414 |
| 2003/0037163 A1 * | 2/2003 | Kitada et al. | 709/236 |
| 2003/0061404 A1 * | 3/2003 | Atwal et al. | 709/328 |
| 2003/0079031 A1 * | 4/2003 | Nagano | 709/229 |
| 2003/0187978 A1 * | 10/2003 | Nakamura et al. | 709/224 |
| 2003/0187992 A1 * | 10/2003 | Steenfeldt et al. | 709/227 |
| 2003/0217162 A1 * | 11/2003 | Fu et al. | 709/229 |
| 2003/0236848 A1 * | 12/2003 | Neiman et al. | 709/213 |
| 2004/0009761 A1 * | 1/2004 | Money et al. | 455/406 |
| 2004/0015599 A1 * | 1/2004 | Trinh et al. | 709/232 |
| 2004/0044585 A1 * | 3/2004 | Franco | 705/26 |
| 2004/0088710 A1 * | 5/2004 | Ronkka et al. | 718/107 |
| 2004/0095932 A1 * | 5/2004 | Astarabadi et al. | 370/389 |
| 2004/0107238 A1 * | 6/2004 | Orton et al. | 709/200 |
| 2004/0152439 A1 * | 8/2004 | Kimura et al. | 455/403 |
| 2004/0205209 A1 * | 10/2004 | Wengrovitz et al. | 709/230 |
| 2004/0210663 A1 * | 10/2004 | Phillips et al. | 709/230 |
| 2004/0215708 A1 * | 10/2004 | Higashi et al. | 709/201 |
| 2004/0243712 A1 * | 12/2004 | Sakai et al. | 709/227 |
| 2004/0248600 A1 * | 12/2004 | Kim | 455/466 |
| 2004/0250059 A1 * | 12/2004 | Ramelson et al. | 713/150 |
| 2004/0250253 A1 * | 12/2004 | Khartabil | 719/310 |
| 2005/0066038 A1 * | 3/2005 | Sakamoto et al. | 709/227 |
| 2005/0078705 A1 * | 4/2005 | Ito | 370/466 |
| 2005/0100008 A1 * | 5/2005 | Miyata et al. | 370/389 |
| 2005/0195842 A1 * | 9/2005 | Dowling | 370/401 |
| 2005/0198197 A1 * | 9/2005 | Yoshiuchi et al. | 709/217 |
| 2005/0204016 A1 * | 9/2005 | McAuley | 709/218 |
| 2005/0278369 A1 * | 12/2005 | Tokita et al. | 707/102 |
| 2006/0085271 A1 * | 4/2006 | Tokita et al. | 705/26 |
| 2007/0104180 A1 * | 5/2007 | Aizu et al. | 370/352 |

FOREIGN PATENT DOCUMENTS

| | | |
|---|---|---|
| JP | 2003-514415 | 4/2003 |
| JP | 2003-256315 | 9/2003 |
| JP | 2004-013377 | 1/2004 |
| JP | 2004-086490 | 3/2004 |
| JP | 2004-523174 | 7/2004 |
| JP | 2005-242547 | 9/2005 |
| WO | 01/35294 | 5/2001 |
| WO | WO 02/069616 | 9/2002 |
| WO | WO 2004/003765 | 1/2004 |

* cited by examiner

FIG. 4

SERVICE DETERMINATION TABLE 15

| Request-Method | Request-URI | To | Content-Type | ... | SERVICE ID |
|---|---|---|---|---|---|
| REGISTER | proxy.aaa.com | ... | | ... | 0001 |
| INVITE | ap1@aaa.com | ap1@aaa.com | | ... | 0002 |
| REGISTER | proxy.aaa.com | ... | application/<br>aaa-bbb-ccc | ... | 0003 |
| SUBSCRIBE | ap1@aaa.com | ap1@aaa.com | | ... | 0004 |
| MESSAGE | ap2@aaa.com | ap2@aaa.com | application/<br>xxx-yyy-zzz | ... | 0005 |
| INVITE | ap2@aaa.com | ap2@aaa.com | ... | ... | 0006 |
| ... | ... | ... | ... | ... | |
| MESSAGE | | | | | N |

CONTENTS OF SIP MESSAGE: 151
1511, 1512, 1513, 1514, 1515
SERVICE ID: 152

FIG. 5

SESSION LOG INFORMATION FILE 16

| REQUESTER USER ID | SERVICE ID | CALL ID | SESSION LOG INFORMATION |
|---|---|---|---|
| Client 2 | 0005 | 1e51as35d4fa63s@pc.aaa.com | START = "2003/9/30/10:15:26" END = "2003/9/30/12:35:54" |
| Client 1 | 0001 | a84b4c76e66710@pc.aaa.com | START = "2003/9/30/10:10:17" END = "2003/9/30/11:12:31" |
| ... | ... | ... | ... |
| ... | ... | ... | ... |

APPLICATION LOG INFORMATION FILE 35

| REQUESTER USER ID 351 | URL OF CORRE-SPONDENT AP 352 | CALL ID 353 | APPLICATION LOG INFORMATION 354 | UNIT PRICE 355 |
|---|---|---|---|---|
| Client 2 | al1@aaa.com | 1e51as35d4fa63s@pc.aaa.com | DOWNLOAD CONTENTS = "MOVIE 0001" | ¥ 500 |
| Client 1 | al1@aaa.com | a84b4c76e66710@pc.aaa.com | DOWNLOAD CONTENTS = "MOVIE 0004" | ¥ 400 |
| ... | ... | ... | ... | |
| ... | ... | ... | ... | |
| | | | | |
| | | | | |
| | | | | |

FIG. 8

USER AUTHENTICATION TABLE 25

| USER ID (251) | PASSWORD (252) |
|---|---|
| Client 1 | aaabbbccc |
| Client 2 | dddeeefff |
| Client 3 | ggghhhiii |
| ... | ... |
| Client N | xxxyyyzzz |

FIG. 9

USER SUBSCRIBED SERVICE TABLE 26

| USER ID (261) | SERVICE ID (262) |
|---|---|
| Client 1 | 001, 002 |
| Client 2 | 003, 004 |
| Client 3 | 005 |
| ... | |
| Client N | N |

STATUS NOTIFICATION PACKET 111

| IP HEADER | UDP/TCP HEADER | STATUS NOTIFICATION MESSAGE (M11) |

201  202  203

M11

```
SIP/2.0 100 Trying
Via: SIP/2.0/UDP pc.aaa.com;branch=z9hG4bKnashds8
 ;received=192.0.2.1
To: Application Server 1 <sip:al1@aaa.com>
From: Client 1 <sip:cl1@aaa.com>;tag=1928301774
Call-ID: a84b4c76e66710
CSeq: 314159 INVITE
Content-Length: 0
```

AP LOG INFORMATION PACKET 128

SESSION LOG INFORMATION PACKET 132

INFORMATION SERVICE COMMUNICATION NETWORK SYSTEM AND SESSION MANAGEMENT SERVER

CLAIM OF PRIORITY

The present application claims priority from Japanese patent application serial No.2004-98235, filed on Mar. 30, 2004, the content of which is hereby incorporated by reference into this application.

BACKGROUND OF THE INVENTION (1) Field of the Invention

The present invention relates to an information service communication network system and a session management server and, more particularly, to a session management server for carrying out a communication procedure for establishing or disconnecting a session between a client terminal and an application server in response to a request from the client terminal in an information service communication network to which a plurality of application servers are connected, and the information service communication network system using the session management server (2) Description of the Related Art As networks running an Internet Protocol (IP) come into popular use, users of various kinds of information services provided by content providers via the Internet are increasing. Application servers for information services include, typically, streaming servers which distribute content information such as music and movies; besides, for example, VM/UM servers for e-mail, conference call servers which allow a plurality of uses to join in an interactive teleconference, and others.

In order to receive an information service from an application server owned by a content provider, an Internet user must register in advance a user ID and user authentication information, such as password required for the user authentication. Registering the user ID and authentication information is required for each service to be provided by the content provider.

A client terminal owned by an Internet user is connected to a target application server via a session management server specified by a contract between the user and the service provider. As the session management server, for example, a Session Initiation Protocol (SIP) server is known. SIP is a protocol for establishing and terminating a session in IP multimedia communication, implementation of which was specified by the Internet Engineering Task Force (IETF) RFC3261.

SUMMARY OF THE INVENTION

A content provider who provides information services to Internet users has to install in advance, in each of its application servers, software for user authentication and service permission that is necessary when a session set up request is received from a client terminal via a session management server. Each application server has to be equipped with functions of recording log information (application log information) for each service to be provided to users and the duration of connection with a client terminal (session log information) and notifying an accounting server of the log information for each session and user.

Therefore, content providers are burdened with considerable cost for developing such management software incidental to information services and equipping the application servers with the software, prior to starting the information service business. The above function of collecting session log information must be equipped on a session management server (e.g., SIP server) as well.

It is an object of the present invention to provide a session management server capable of reducing the load of application servers.

It is another object of the present invention to provide a session management server that enables a flexible change in accounting for each user of application servers.

It is still another object of the present invention to provide an information service communication network system that enables content providers to administrate their application servers easily with reduced cost burdens.

It is further object of the present invention to provide an information service communication network system capable of reducing the load of application servers for information services.

To achieve the foregoing objects, a session management server (e.g., a SIP server) according to the present invention is comprised of control means for determining, when receiving a session setup request packet issued from a client terminal to a particular application server, whether the client terminal is authorized to receive an information service to be provided by the application server, in place of the particular application server, and forwarding the session setup request packet to the particular application server when the determination resulted in success.

The determination as to the information service permission to the client terminal can be implemented, for example, by providing the session management server with a service determination table comprising a plurality of entries each indicating the relation between possible particular items of information which maybe extracted from a session set up request packet and a service identifier, and a user subscribed service table comprising a plurality of entries each indicating a user identifier and a service identifier of information service available for a user having the user identifier, so that when receiving a session setup request packet issued from a client terminal to a particular application server, the control means specifies a service identifier corresponding to the request packet by referring to the service determination table and verifies the relation between the user identifier indicated in the request packet and the service identifier thus specified, by referring to the user subscribed service table.

If user authentication based on the user identifier and authentication information indicated in the received packet is required, the determination as to the information service permission shall be performed after the user authentication.

For example, in an information service communication network including a subscriber management server for performing user authentication in conjunction with the session management server, the session management server sends a user authentication request to the subscriber management server when receiving a session setup request packet form a client terminal, the user authentication request including the user identifier and authentication information extracted from the request packet received. After receiving a response indicating that the user identifier was authenticated from the subscriber management server, the session management server determines whether the client terminal is authorized to receive an information service from the particular application server.

The determination as to the information service permission to the client terminal may be performed in conjunction with the subscriber management server. In this case, the above user subscribed service table may be provided on the subscriber management server. After the user identifier is authenticated, the session management server specifies a service identifier corresponding to the session setup request packet by referring to the service determination table and sends a user subscribed service authorization request designating the user identifier indicated in the session setup request packet and the service identifier thus specified to the subscriber management server.

Another feature of the session management server of the present invention resides in that, when forwarding an acknowledge response packet, which has been issued in response to the session setup request packet from the application server, to the requester client terminal, the session management server starts collection of session log information in association with the user identifier of the session setup request packet (or the response packet) and the service identifier specified from the service determination table.

By applying the above session management server, an information service communication network according to the present invention is characterized in that each application server can return an acknowledge response packet in response to the session setup request packet to establish a session with the client terminal without executing service authentication on the client terminal.

Further, the information service communication network according to the present invention is characterized in that the session management server collects session log information and the application server collects only application log information during the communication with a client terminal, and, upon the session termination, the application log information collected by the application server and the session log information collected by the session management server is sent to an accounting server, thereby to unify accounting processing for the client terminal user.

According to the present invention, because the session management server determines whether each client terminal is authorized to receive an information service from a specified application server, in place of the application server, the load of each application server and the burden of the content provider can be reduced.

According to the present invention, the session management server can collect all session log information for a plurality of application servers. This enables reducing the load of each application server and making it unnecessary for the content provider to do work for unifying session log information formats per application server. Collecting session log information in association with each user identifier and each service identifier makes a flexible accounting feasible, for instance, the session unit price can be selectable on a per-service basis.

BRIEF DESCRIPTION OF THE DRAWINGS

FIG. 4 shows an example of a service determination table structure provided in the SIP server.

FIG. 5 shows an example of a session log information file structure provided in the SIP server.

FIG. 6 shows an example of an application log information file structure provided in an application server.

FIG. 8 shows an example of a user authentication table structure provided in the subscriber management server.

FIG. 9 shows an example of a user subscribed service table structure provided in the subscriber management server.

DETAILED DESCRIPTION OF THE PREFERRED EMBODIMENTS

Embodiments of the present invention will be described hereinafter by referring to the accompanying drawings.

Figure 1:
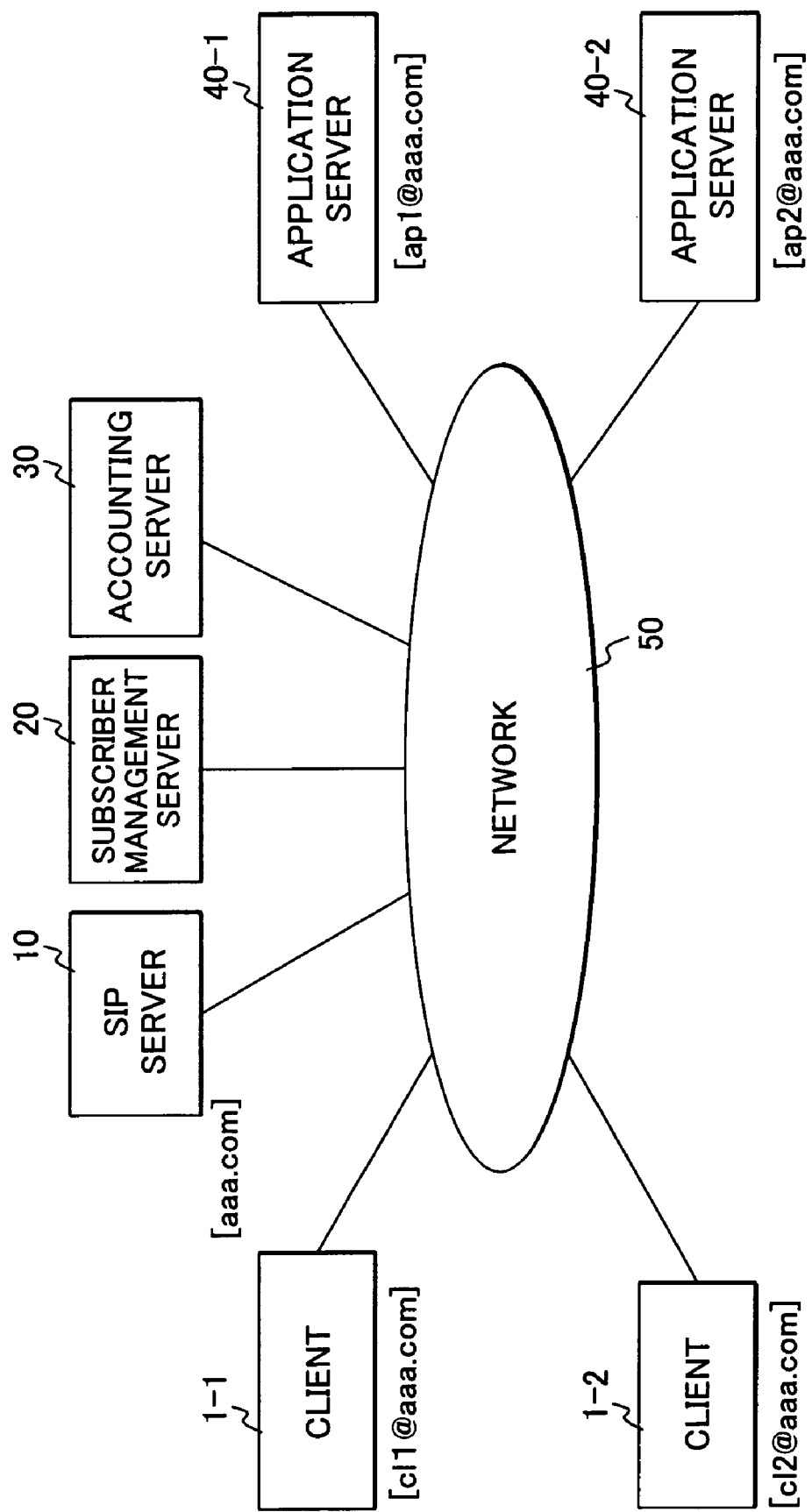
FIG. 1 shows an example of a communication network system to which the present invention is applied.

FIG. 1 shows one example of a communication network system to which a session management apparatus (hereinafter referred to as a SIP server) of the present invention is applied. The communication network system is comprised of the following elements connected to a network 50: a plurality of client terminals 1 (1-1, 1-2, . . . ), a SIP server 10 provided with a session management function, a subscriber management server 20, an accounting server 30, and a plurality of application servers 40 (40-1, 40-2, . . . ) for providing information services to the client terminals 1. The application servers 40 include, for example, an instant message server, a content distribution server for providing kinds of content information to clients, a conference call server for supporting an interactive teleconference in which a plurality of clients may join, and others.

Here, each character string typed in brackets associated with each of the client terminals 1 and the application servers 40 represents the addresses of the apparatus for use in IP packets to be transmitted on the network 50. Each of these addresses includes the SIP server 10 address "aaa.com" indicating that these terminals and application servers belong to the SIP server 10. Each connection (session) between each client terminal 1 and one of application servers 40 is established via the SIP server 10.

Figure 2:
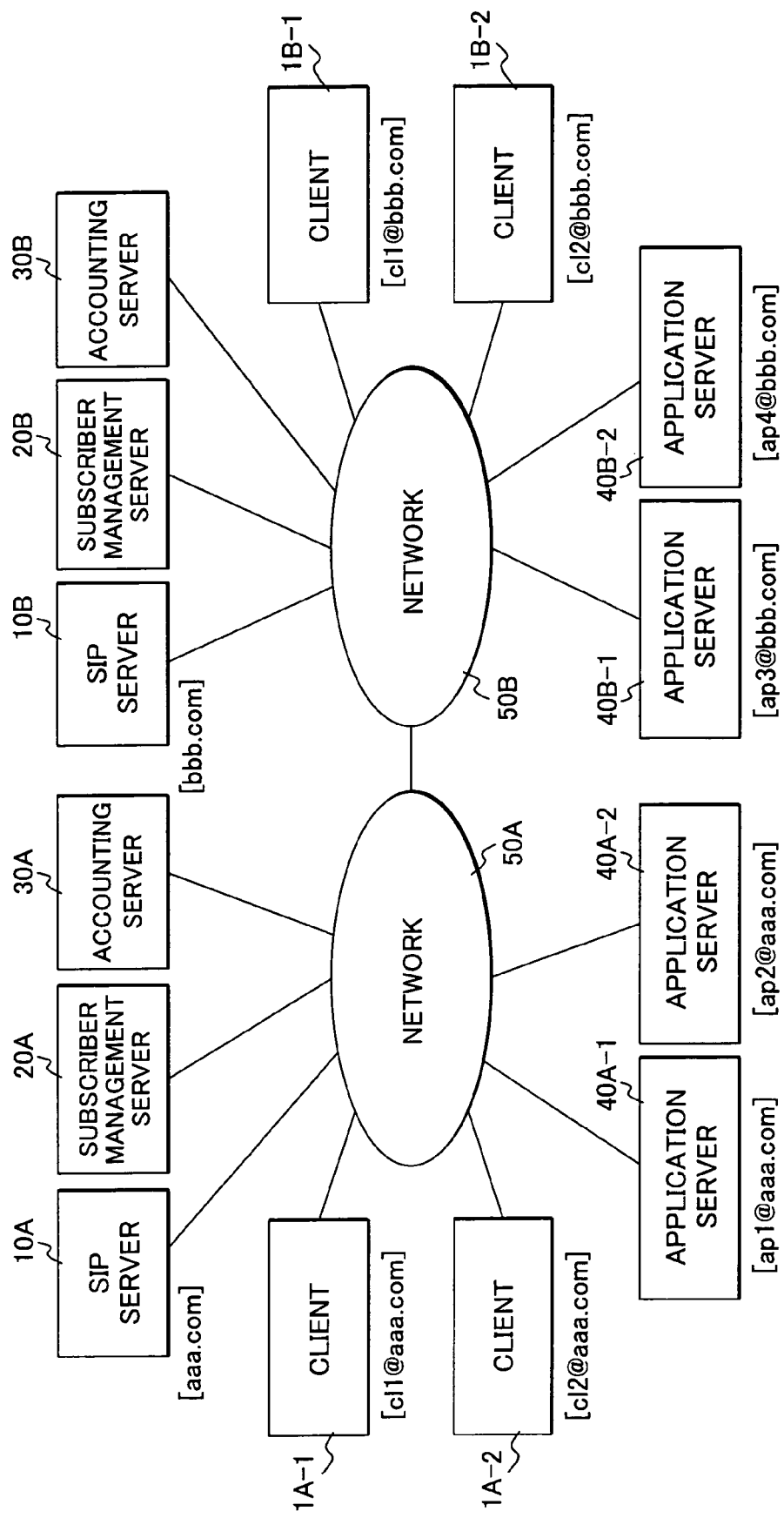
FIG. 2 shows another topology example of a communication network system to which the present invention is applied.

FIG. 2 shows another topology example of a communication network system to which SIP servers of the present invention are applied. In the example shown here, the communication network system is comprised of a first network 50A managed by a SIP server 10A and a second network 50B managed by a SIP server 10B. In conjunction with the SIP server 10A, a subscriber management server 20A connected to the first network 50A performs authentication processing for client terminals 1A (1A-1, 1A-2, . . . ) accommodated in the first network 50A. In conjunction with the SIP server 10A, an accounting server 30A connected to the first network 50A performs accounting processing for the client terminals 1A and application servers 40A (40A-1, 40A-2 . . . ) accommodated in the first network 50A.

Likewise, in conjunction with the SIP server 1-B, a subscriber management server 2-B connected to the second network 50B performs authentication processing for client terminals 1B (1B-1, 1B-2, . . . ) accommodated in the second network 50B. In conjunction with the SIP server 10B, an accounting server 30B connected to the second network 50B performs accounting processing for the client terminals 1B and application servers 40B (40B-1, 40B-2 . . . ) accommodated in the second network 50B.

When a client terminal connected to the first network, for example, a client terminal 1A-1 issues a request (session setup request) for connection to an application server connected to the second network, for example, a server 40B-2, this connection request is received by the SIP server 10A. Determining that the requested connection is destined for the server 40B-2, which is accommodated in the second network 50B under the management of the SIP server 10B, the SIP server 10A forwards the connection request to the SIP server 10B. On the other hand, a connection response from the application server 40B-2 is forwarded via the SIP server 10B to the SIP server 10A and sent back to the requester client terminal 1A-1 from the SIP server 10A.

Figure 3:
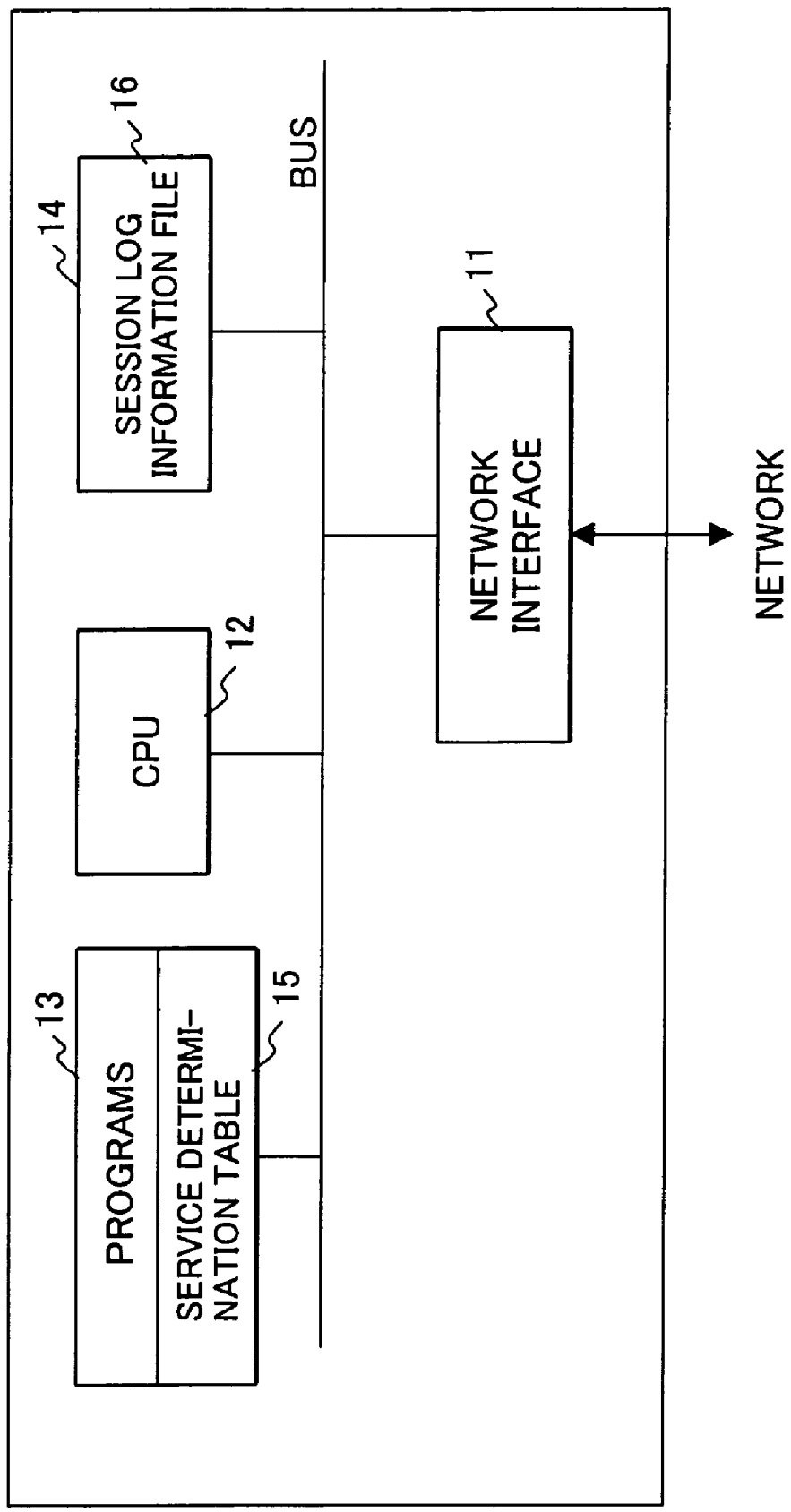
FIG. 3 shows a block diagram structure of a SIP server according to the present invention.

FIG. 3 shows a block diagram structure of the SIP server 10 (10A, 10B). The SIP server 10 is comprised of a network interface 11 for connection to the network 50 (50A, 50B), a processor (CPU) 12, a memory 13 for storing various programs to be executed by the processor 12 and a service determination table 15, and a large capacity memory (hard disk storage) 14 for forming a session log information file 16 and storing other file data. In the memory 13, a SIP protocol processing routine and a session log information collecting routine are provided as programs relevant to the present invention.

One feature of the present invention resides in that the SIP server 10 executes in conjunction with the subscriber management server 20, when receiving from a client terminal a connection request (SIP: INVITE message) for establishing a connection with any one of application servers under the management of the management server, not only authentication of the client terminal (user authentication) but also authentication of eligibility for each service (user service authorization) in place of the application server 40.

Another feature of the present invention resides in that, when a session between a client terminal and an application server was set up, the SIP server 10 starts collecting log information per session and, when receiving a request to disconnect the session (SIP: BYE message) with the application server from the client terminal, the SIP server 10 transfers, in conjunction with the application server, the log information on a per-session and a per-application basis to the accounting server 30 so that the log information is stored on the accounting server 30.

FIG. 4 shows an example of a service determination table 15 provided in the SIP server 10. The service determination table 15 comprises a plurality entries each predefined the relation between the possible contents of a SIP message 151 which a client terminal may issue and a service ID 152.

The service ID is the identifier of an information service that is provided by an application server. By getting a service ID 152, the application server that provides the service is identified. The contents of a SIP message 151 include a plurality of items of information required to determine the service ID, for example, request method 1511 indicating the type of the SIP message, request URI 1512, destination address 1513, content type 1514, and other information 1515.

Upon receiving a SIP message from a client terminal, the SIP server 10 extracts information for the items 1511 to 1515 from the received message and searches the service determination table 15 for the service ID corresponding to the received message. The service ID obtained by the search is used for user service authorization in conjunction with the subscriber management server 20.

FIG. 5 shows an example of a session log information file 16 provided in the SIP server 10.

In the session log information file 16, session log information 164 is recorded, in association with session requester user ID 161, service ID 162, and call ID 163 extracted from a SIP message. Here, to calculate the duration of session connection, session connection start time and end time are recorded as the session log information 164.

FIG. 6 shows an example of an application log information file 35 provided in each application server 40. In the application log information file 35, application log information 354 and a service unit price 355 is specified, in association with requester user ID 351, URI of correspondent AP 352, and call ID 353.

Figure 7:
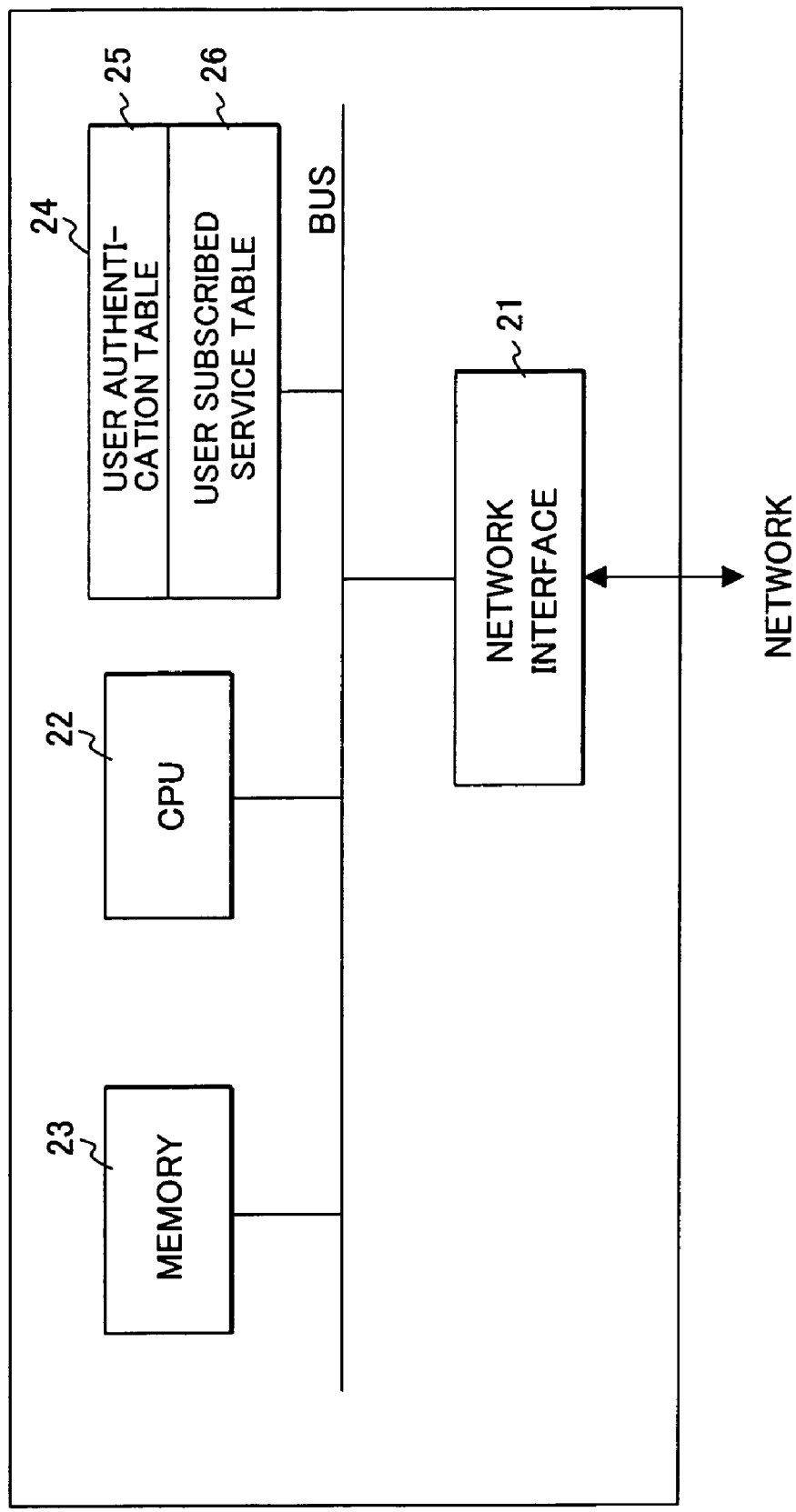
FIG. 7 shows a block diagram structure of a subscriber management server.

FIG. 7 shows a block diagram structure of the subscriber management server 20. The subscriber management server 20 is comprised of a network interface 21 for connection to the network 50 (50A, 50B), a processor (CPU) 22, a memory 23 for storing various programs to be executed by the processor 22, and a hard disk storage 24 for storing a user authentication table 25 and a user subscribed service table 26.

FIG. 8 shows an example of the user authentication table 25. The user authentication table 25 comprises a plurality of entries each indicating the relation between an identifier (user ID) 251 of a client terminal user contracted the SIP server 10 for the connection service and a password 252 registered in advance by each user.

FIG. 9 shows an example of the user subscribed service table 26. The user subscribed service table 26 comprises a plurality of entries each indicating the relation between a user ID 261 and an identifier (service ID) 262 of an information service -available for the user. Although the user authentication table 25 and the user subscribed service table 26 are provided as separate tables here, these tables may be combined into a single table so that both a password and service ID can be retrieved at once by using a user ID as a search key.

Next, the operation of the SIP server 10 of the present invention will be described in detail with reference to FIGS. 10 to 23.

Figure 10:
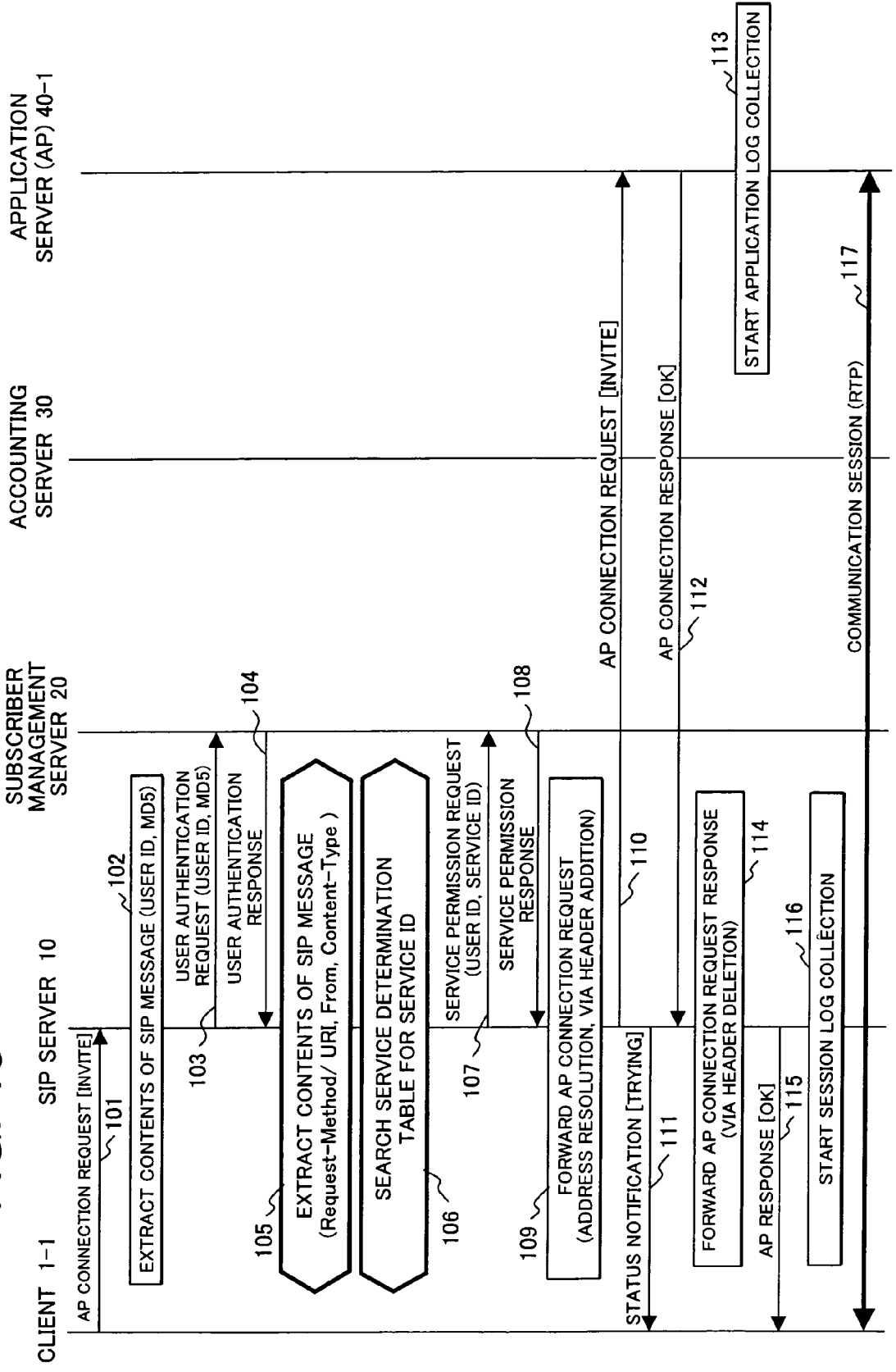
FIG. 10 shows a chart of communication sequence starting with an AP connection request from a client in the communication network shown in FIG. 1.

FIG. 10 shows a chart of communication sequence starting with a session setup request (hereinafter referred to as an AP connection request) issued by a client terminal 1-1 in the communication network shown in FIG. 1. For example, when the client terminal 1-1 user wishes to set up a session with an application server 40-1, the client terminal 1-1 transmits an AP connection request packet 101 designating the URI of the application server 40-1 to the SIP server 10.

As shown in FIG. 12A, the AP connection request packet 101 is comprised of an IP header 201, UDP/TCP header 202, and payload 203. The payload 203 includes an AP connection request message M01 according to the SIP (Session Initiation Protocol) specified by the IETF (Internet Engineering Task Force) RFC3261.

A SIP message is comprised of a start line indicating the type (Request Method) of the SIP message and the destination address (URI), a header part describing a request or response, and a message body part describing the details of the session. A Session Description Protocol (SDP), implementation of which was specified by IETF RFC 3266, is applied to the message body to describe the details of the SIP session.

As shown in FIG. 12B, the AP connection request SIP message M01 includes in its start line, "INVITE" as the request method indicating that this message is a session connection request, and the URI "ap1@aaa.com" of the application server 40-1 as the destination address.

In the SIP, a "Via" header indicating the route of the SIP message is added to the first portion of the header part. Here, the Via header is parenthesized to denote that it is not yet added when the SIP server receives the message from the client terminal 1-1. However, as will be described later, when the SIP message is forwarded from the SIP server 10 to the destination application server 40-1 (110), the Via header including the URI "aaa.com" of the SIP server 10 is added. "To" header and "From" header indicate the destination and the source of the SIP message, respectively. "Call-ID" indicates a session identifier specified at the source. "Proxy-Authorization" header includes the source user ID "Digest username", the domain "realm" to which the source belongs, a random number "nonce" to be used in encryption, and a value of MD5 (Message Digest No. 5) which is an encrypted password "response". "Contact" header indicates the URI of the client terminal 1-1 to be registered with the SIP server. "Content-Type" header and "Content-Length" include information defining the message body part SDP.

Figure 13:
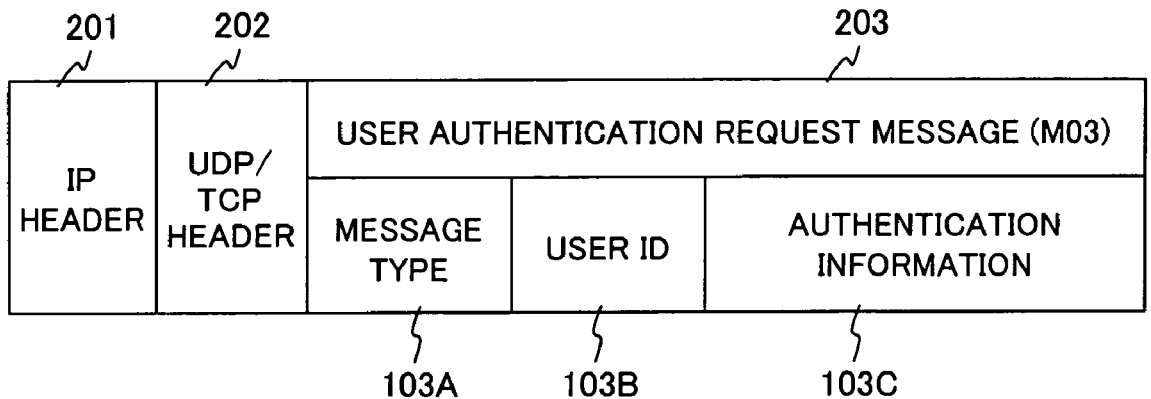
FIG. 13 illustrates the format of a user authentication request packet 103 shown in FIG. 10.

Upon receiving the AP connection request packet 101, the SIP server 10 extracts the user ID "client1" and the value of MD5 from the "Proxy-Authorization" header of the SIP message M01. The SIP server 10 creates a user authentication request message M03 including the extracted information and sends the message M03 in the form of a user authentication request packet 103 shown in FIG. 13 to the subscriber management server 20. As illustrated in FIG. 13, the user authentication request message M03 to be set in the pay load 203 of the packet 103 comprises message type 103A indicating that this message is a user authentication request, a user ID 103B, and authentication information (the value of MD5) 103C.

Upon receiving the user authentication request packet 103, the subscriber management server 20 searches the user authentication table 25 shown in FIG. 8 for the password corresponding to the user ID 103B and encrypts the password with a predetermined random number. If the received authentication information (the value of MD5) 103C agrees with the encrypted password value generated at the subscriber management server 20, the requesting user is authenticated as a valid user.

Figure 14:
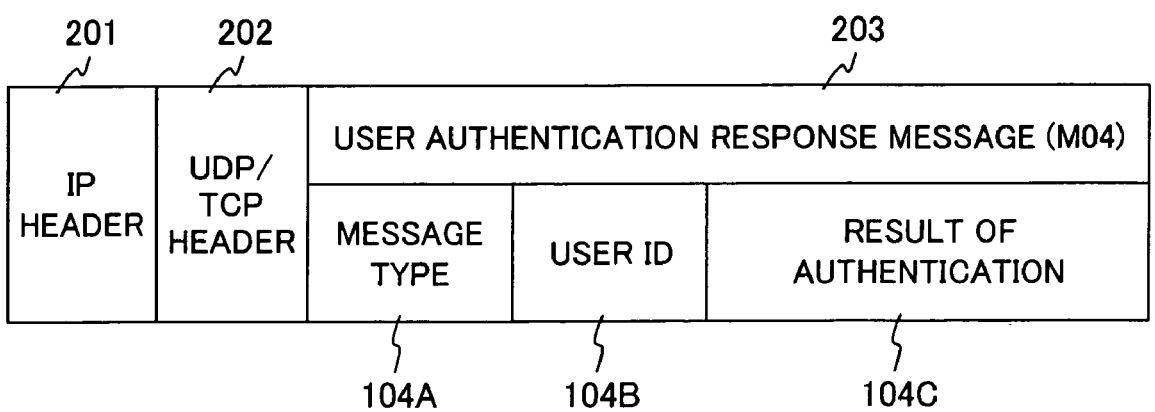
FIG. 14 illustrates the format of a user authentication response packet 104 shown in FIG. 10.

The subscriber management server 20 creates a response message M04 indicating the result of the user authentication and sends this message as a user authentication response packet 104 shown in FIG. 14 to the SIP server 10. The response message M04 includes the message type 104A indicating that this message is a user authentication response, user ID 104B, and authentication result 104C.

Figure 15:
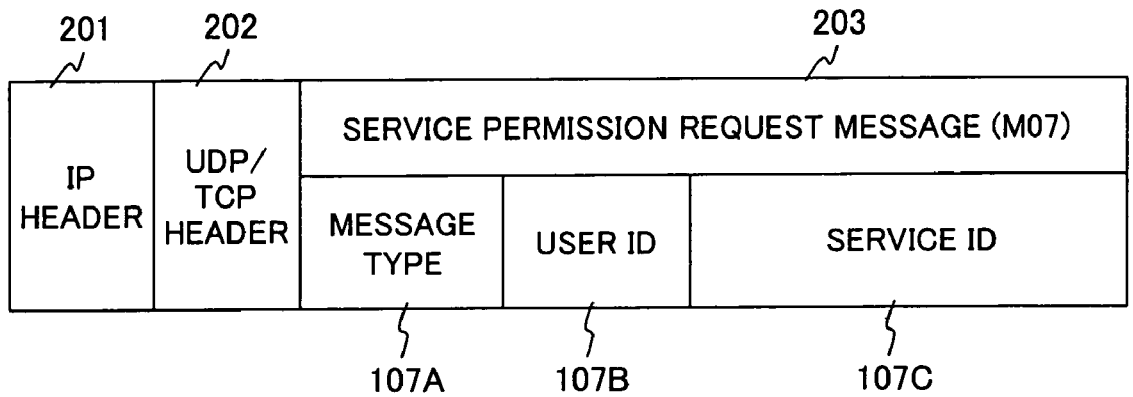
FIG. 15 illustrates the format of a service permission request packet 107 shown in FIG. 10.
Figure 16:
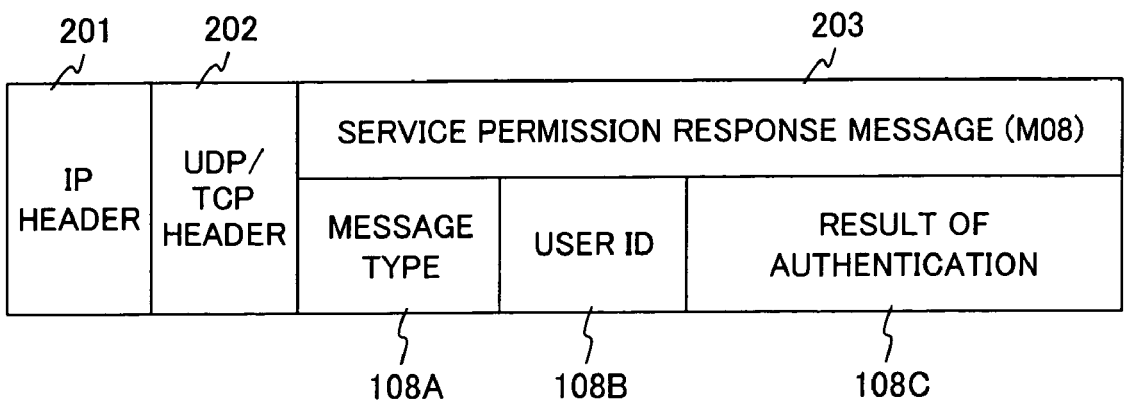
FIG. 16 illustrates the format of a service permission response packet 108 shown in FIG. 10.

Upon judging that the user authentication was successful from the response packet 104, the SIP server 10 extracts the Request-Method, URI, and Content-Type from the SIP message M01 (105), searches the service determination table 15 for the service ID 152 corresponding to the combination of the above items of information (106), and creates a service permission request message M07 shown in FIG. 15.

The service permission request message M07 includes the. message type 107A indicating that this message is a service permission request, user ID 107B, and service ID 107C. In this case, the user ID "client1" extracted from the SIP message M01 is set as the user ID 107B, and the service ID 152 retrieved from-the service determination table 15 is set as the service ID 107C. The service permission request message M07 is sent as a service permission request packet 107 to the subscriber management server 20.

The subscriber management server 20 refers to the user subscribed service table 26 based on the user ID 107B specified in the service permission request message M07, and determines whether the service ID 107C is registered in the table 26. The result of this determination is returned as a service permission response message 108 to the SIP server 10.

The service permission response packet 108 includes a service permission response message M08 in its payload 203 and the message includes the message type 108A indicating that this message is a service permission response, user ID 108B, and authentication result 108C.

Upon judging from the service permission response message M08 that the service authorization was successful, the SIP server 10 specifies the IP address of the destination application server 40-1 from the URI in the "To" header of the AP connection request message M01 (address resolution), sends the AP connection request packet 110 to the application server, and sends a status notification packet 111 to the requester client terminal 1-1. The address resolution for the application server 40-1 is performed by referring to a URI/IP address mapping table provided in the SIP server 10 or by sending a query to a DNS server not shown.

Figures 17A, 17B:
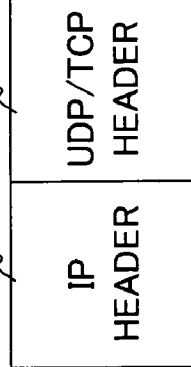
FIG. 17A illustrates the format of a status notification packet 111 shown in FIG. 10.
FIG. 17B illustrates the format of a status notification message M11 shown in FIG. 10.

In the AP connection request message M01 forwarded as the AP connection request packet 110 to the destination application server 40-1, the Via header including the SIP server address (URI), as described in the parentheses in FIG. 12B, is added. As shown in FIG. 17A, the status notification packet 111 includes a status notification message M11 in its payload 203. The status notification message M11 includes, as shown in FIG. 17B, "100 Trying" in the start line to indicate that the request is being delivered to the destination apparatus, and the Via header indicating the SIP server address, several items of header information (To, From, Call-ID, CSeq) extracted from the AP connection request message M01, and Content-Length header in the header part.

Having received the AP connection request packet 110, the application server 40-1 immediately returns an AP connection response packet 112 to the SIP server 10 without executing user authentication and service authorization and starts processing for collecting application log information for the connection requester user ID "client1" (113).

Figure 18A:
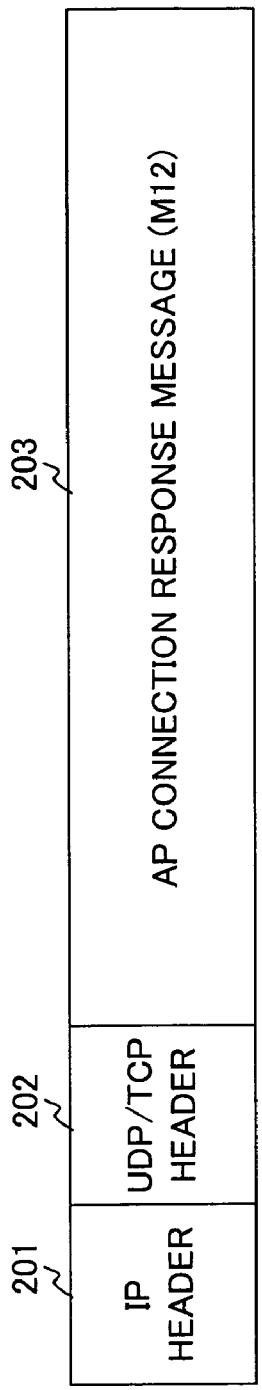
FIG. 18A illustrates the format of an AP connection response packet 112 shown in FIG. 10.
Figure 18B:
FIG. 18B illustrates the format of an AP connection response message M12 shown in FIG. 10.

The AP connection response packet 112 includes, as shown in FIG. 18A, an AP connection response message M12 in its payload 203. The AP connection response message M12 includes, as shown in FIG. 18B, "200 OK" in the start line to indicate that this message is a response message, and several items of header information (Via, To, From, Call-ID, CSeq, Content-Type) extracted from the AP connection request message M01, Contact header, and Content-Length header in the header part. In the "To" header, tag information specified at the application server 40-1 is added. The Contact header indicates the IP address of the application server 40-1.

Upon receiving the AP connection response packet 112, the SIP server 10 removes the Via header from the AP connection response message M12 (114), transmits the message as an AP response packet 115 to the requester client terminal 1-1, and starts processing for collecting session log information for the connection requester user ID "client1" (116). Specifically, the SIP server 10 adds a new entry (record) including the user ID and Call-ID extracted from the AP connection response message M12 (or AP connection request message M01) and the service ID retrieved by the service determination table search (106) to the session log information file 16 shown in FIG. 5 and records the present time as the session start time.

Through the above-described procedure, a communication session (RTP) is established between the client terminal 1-1 and the application server 40-1 (117), so that the client terminal 1-1 can access to the application server 40-1 and the application server 40-1 can provide the information service to the client terminal 1-1. The SIP server 10 continues to collect the session log information and the application server 40-1 continues to collect the application log information until the session is released.

Figure 19:
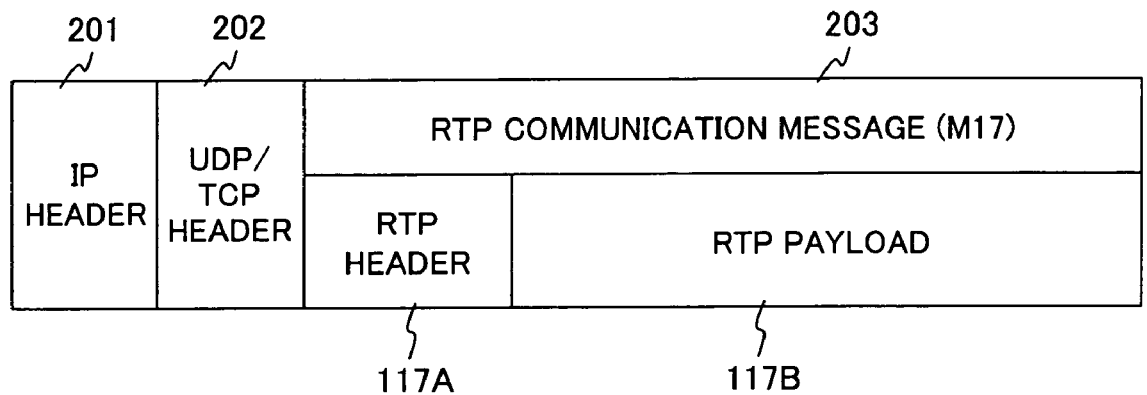
FIG. 19 illustrates the format of an RTP communication packet 117 shown in FIG. 10.

FIG. 19 illustrates an IP packet including an RTP communication message M17 to be applied in the communication between the client terminal 1-1 and the application server 40-1. The RTP communication message M17 is comprised of an RTP header 117A and RTP payload 117B and the RTP payload 117B includes a transmission command or data such as audio to be transmitted.

Figure 11:
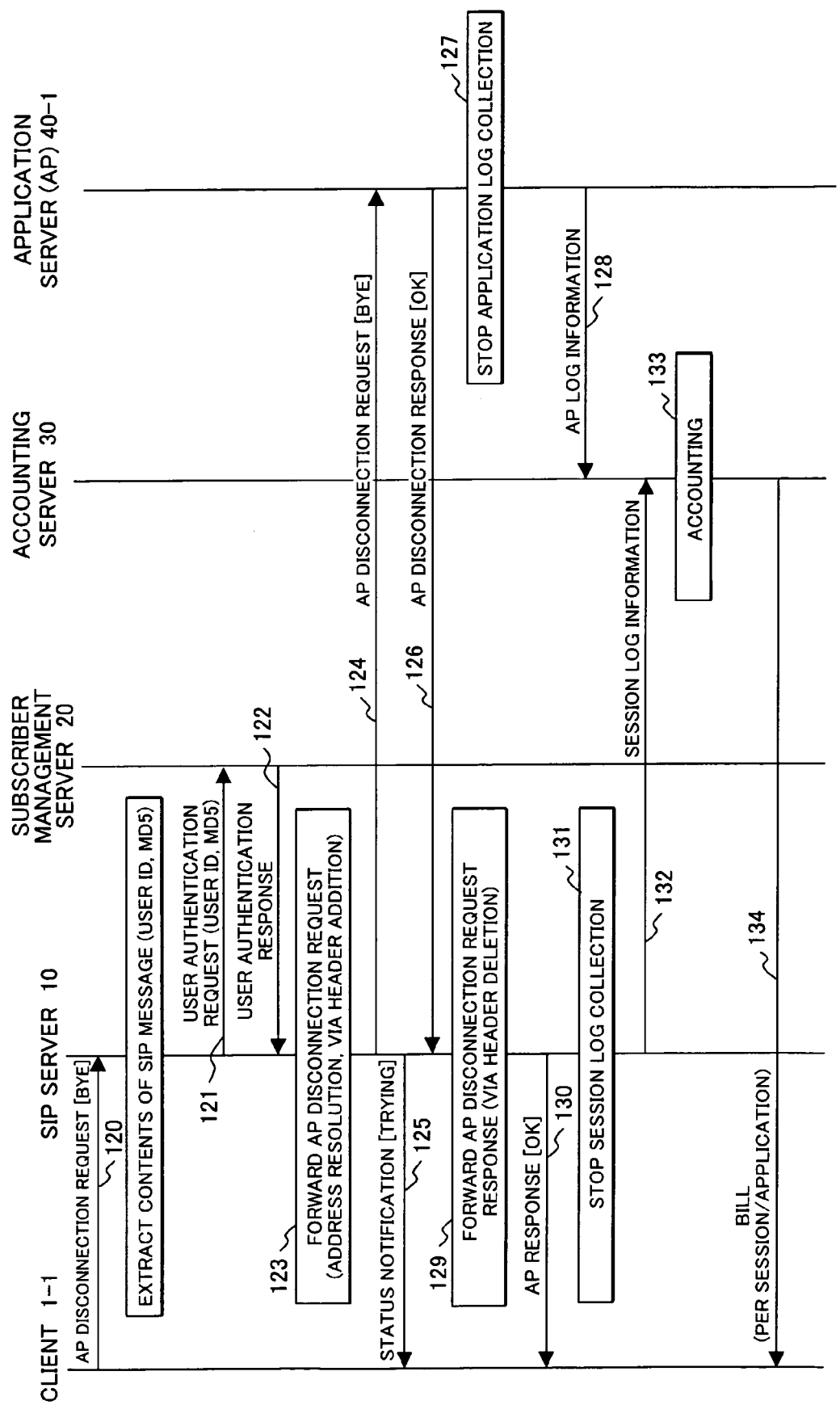
FIG. 11 shows a chart of communication sequence starting with an AP disconnection request from the client in the communication network shown in FIG. 1.
Figure 12:
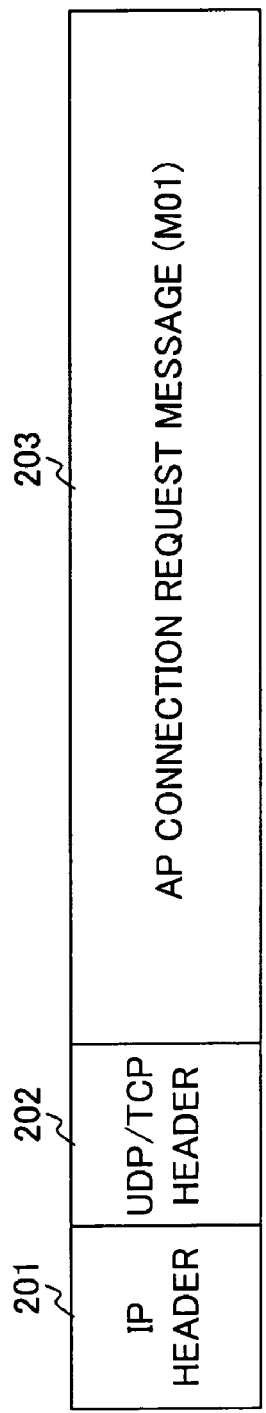
FIG. 12A illustrates the format of an AP connection request packet 101 shown in FIG. 10.
FIG. 12B illustrates the format of an AP connection request message M01 shown in FIG. 10.

FIG. 11 shows a chart of communication sequence starting with an AP disconnection request issued from the client terminal 1-1.

Figure 20A:
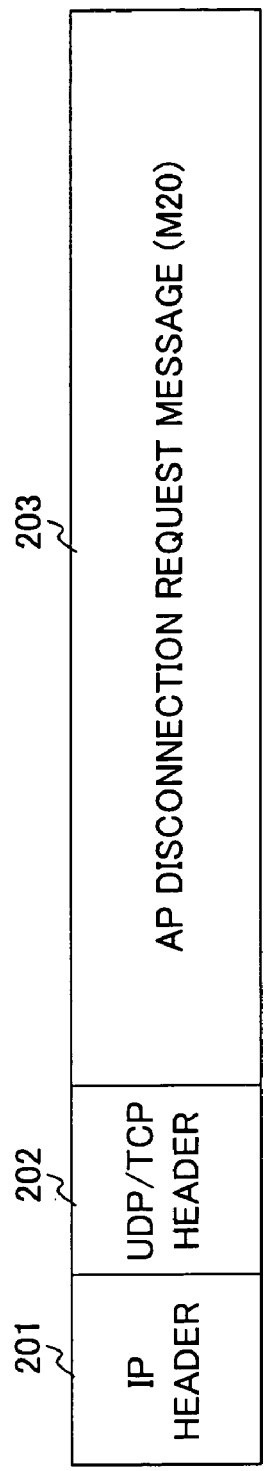
FIG. 20A illustrates the format of an AP disconnection request packet 120 shown in FIG. 11.
Figure 20B:
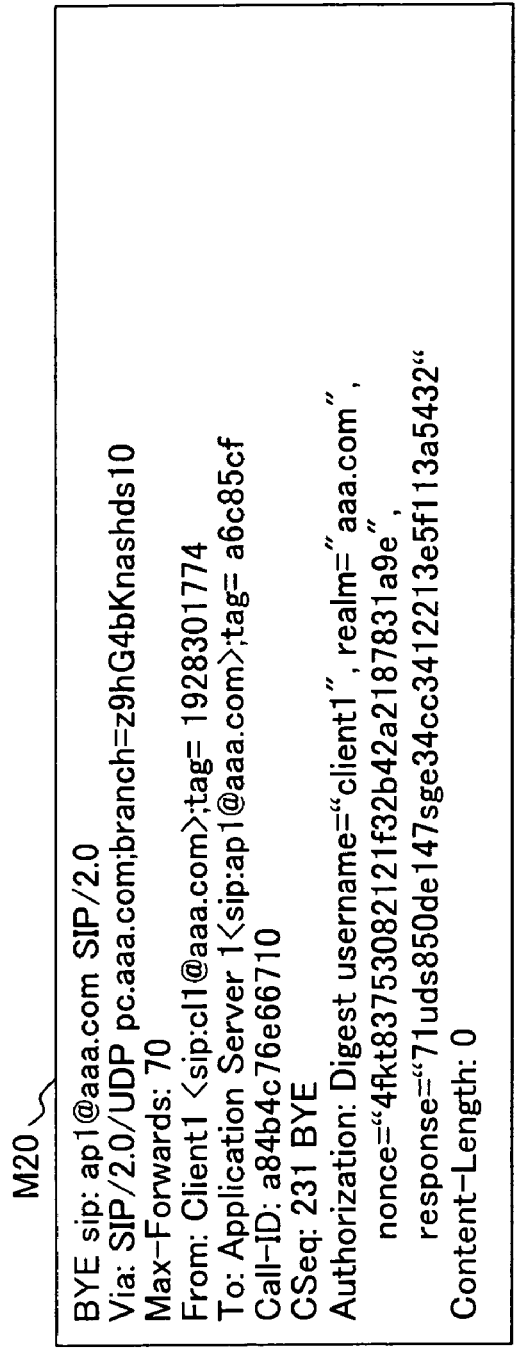
FIG. 20B illustrates the format of an AP disconnection request message M20 shown in FIG. 11.

To terminate the communication with application server 40-1, the client 1-1 sends a session disconnection request (AP disconnection request) packet 120 to the SIP server 10. The AP disconnection request packet 120 includes, as shown in FIG. 20A, an AP disconnection request message M20 in its payload 203. The AP disconnection request message M20 includes, as shown in FIG. 20B, "BYE" as a SIP request method in its start line to indicate that this message is a disconnection request. This message also includes tag information in both the "To" and "From" headers. At this time, the message does not include a Via header which will be added by the SIP server 10.

Having received the AP disconnection request packet 120, the SIP server 10 parses the SIP message M20, extracts the user ID "client1" and the value of MD5 from the Authorization header, and sends a user authentication request packet 121 including these items of information as a user authentication request message to the subscriber management server 20. Upon receiving the user authentication request packet 121, the subscriber management server 20 performs user ID authentication processing in the same procedure as for user authentication upon an AP connection request described by referring to FIG. 10 and sends back a user authentication response packet 122 indicating the result of the authentication to the SIP server 10.

Upon judging from the user authentication response packet 122 that the user authentication was successful, the SIP server 10 specifies the IP address of the destination application server 40-1 from the URI in the "To" header of the AP disconnection request message M20 (URI to address resolution) in the same way as for the AP connection request and adds a Via header including the SIP server address (URI) to the AP disconnection request message M20 (123). Then, the SIP server 10 sends an AP disconnection request packet 124 to the destination application server, sends a status notification packet 125 indicating that the request is being delivered to the destination apparatus to the requester client terminal 1-1, and waits for a response from the destination application server.

Having received the AP disconnection request packet 124, the application server 40-1 returns an AP disconnection response packet 126 to the SIP server 10 and stops the processing for collecting the application log information for the connection requester user ID "client1" (127), creates an application log message including the application log information for the user ID "client1", and sends the message as an AP information packet 128 to the accounting server 30.

Figures 21A, 21B:
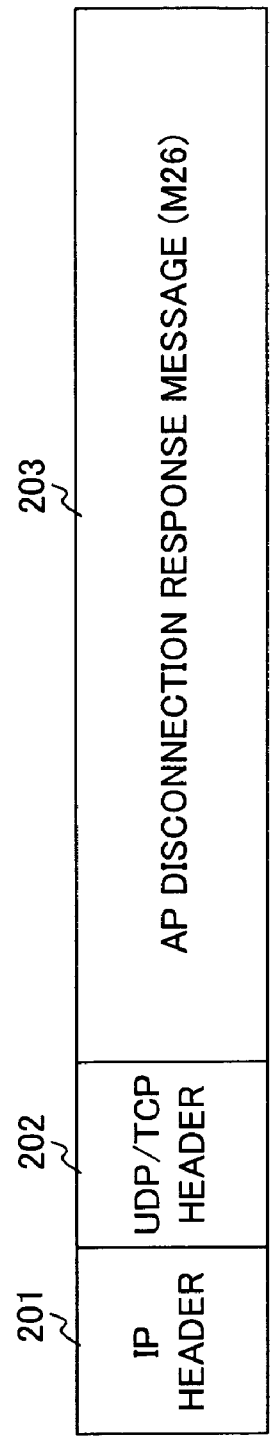
FIG. 21A illustrates the format of an AP disconnection response packet 124 shown in FIG. 11.
FIG. 21B illustrates the format of an AP disconnection response message M26 shown in FIG. 11.

The AP disconnection response packet 126 includes, as shown in FIG. 21A, an AP disconnection response message M26 in its payload 203. The AP disconnection response message M26 includes, as shown in FIG. 21B, "200 OK" in its start line to indicate that this message is a response message, and several items of header information (Via, To, From, Call-ID, CSeq) extracted from the AP disconnection request message M20 and Content-Length header in the header part.

Upon receiving the AP disconnection response packet 126, the SIP server 10 removes the Via header from the AP disconnection response message M26 extracted from the payload (129), transmits this message as an AP response packet 130 to the requester client terminal 1-1, and stops the processing for collecting the session log information for the connection requester user ID "client1" (131). Specifically, the SIP server 10 records in the session log information file 16 shown in FIG. 5 the present time as the session end time in the table entry corresponding to the user ID and Call-ID extracted from the AP disconnection response. message M26 (or AP disconnection request message M20). After that, the SIP server 10 creates a session log message including the session log information for the disconnection requester user ID "client1" and sends this message as a session log information packet 132 to the accounting server 30.

Whenever receiving the AP log information packet 128 or session log information packet 132, the accounting server 30 updates the accounting information entry for the client terminal user registered in the accounting database (accounting 133), based on the AP log information or session log information in the received packet. The Accounting server 30 periodically issues a bill 134 on a per-session basis and on a per-application basis to the client terminal user.

Figure 22:
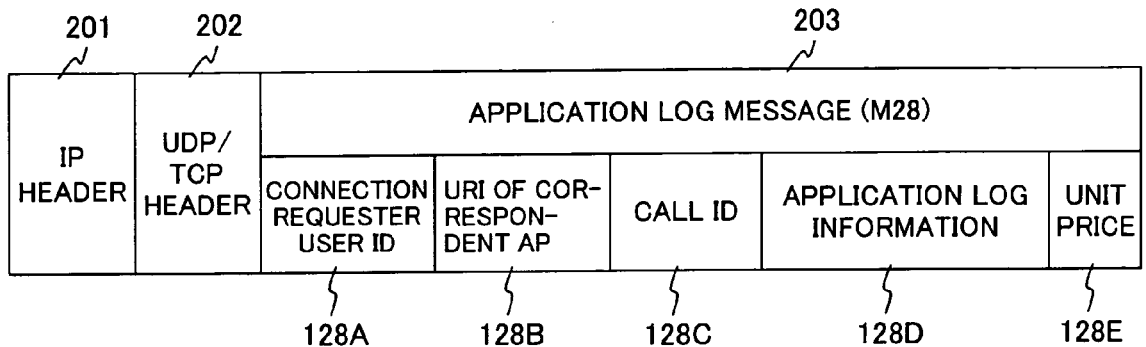
FIG. 22 illustrates the format of an AP log information packet 128 shown in FIG. 11.

FIG. 22 illustrates the format of the AP log information packet 128 to be sent from the application server 40-1 to the accounting server 30. An application log message M28 to be carried by the payload 203 of the AP log information packet 128 includes the connection requester user ID 128A, URI of correspondent AP 128B, Call ID 128C, application log information 128D, and unit price 128E. These items of information correspond to the user ID 351, URI of correspondent AP 352, Call ID 353, application log information 354, and unit price 355 recorded in the application log information file 35 shown in FIG. 6.

Figure 23:
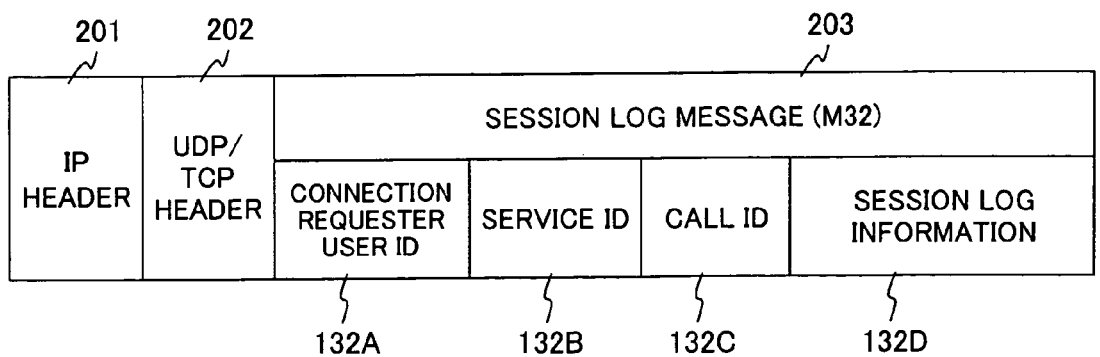
FIG. 23 illustrates the format of a session log information packet 132 shown in FIG. 11.

FIG. 23 illustrates the format of the session log information packet 132 to be sent by the SIP server 10 to the accounting server 30. A session log message M32 to be carried by the payload 203 of the session log information packet 132 includes the connection requester user ID 132A, service ID 132B, Call ID 132C, and session log information 132D. These items of information correspond to the user ID 161, service ID 162, Call ID 163, and session log information 164 recorded in the session log information file 16 shown in FIG. 5.

Figure 24:
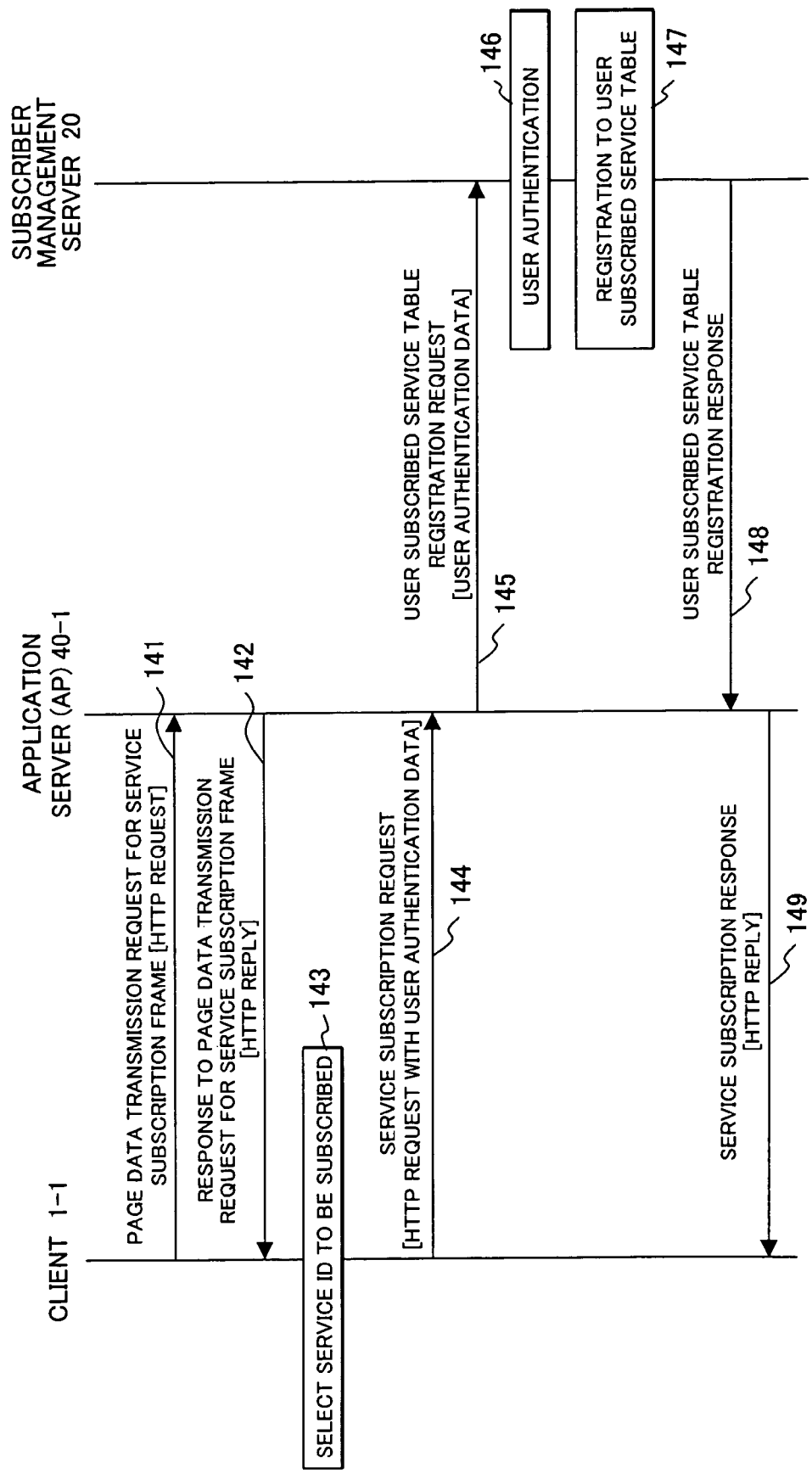
FIG. 24 shows an example of communication sequence 1 starting with a service subscription request from a client in the communication network shown in FIG. 1.

FIG. 24 shows an example-of communication sequence in which the client terminal subscribes a service to be provided by the application server prior to the information service from the application server.

The client terminal 1-1 sends a page data transmission request packet 141 for a service subscription procedure to the application server 40-1. The page data transmission request is issued, for example, from the home page screen provided on the Internet by the application server 40-1 and sent as an HTTP request to the application server 40-1.

In response to the HTTP request, the application server 40-1 returns a response packet 142 including the page data for the service subscription procedure to the client terminal 1-1. When the client terminal receives the response packet 142, a service subscription page screen is displayed on the client terminal. On the service subscription page screen, the user selects the identifier of a service (service ID) to which the user wishes to subscribe and enters items of information necessary for service authorization, such as a password for user authentication. These items of information are sent to the application server 40-1 together with the user ID as a service subscription request (HTTP request) packet 144.

Figure 25:
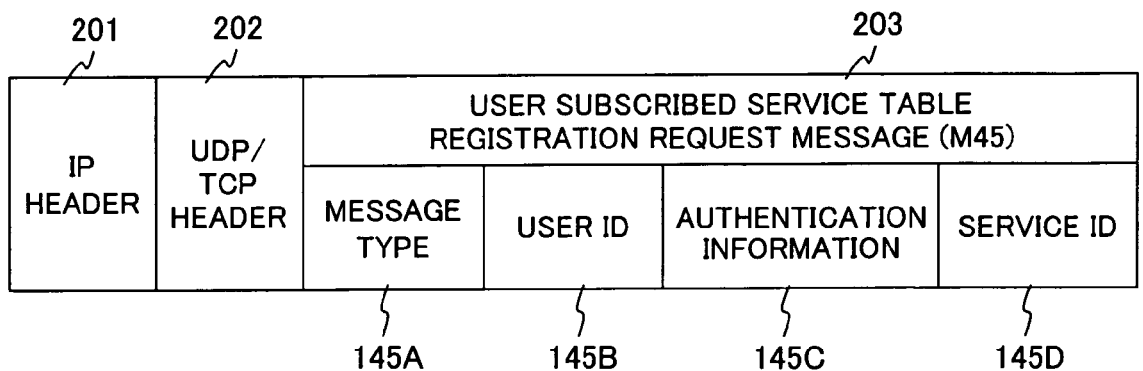
FIG. 25 illustrates the format of a user subscribed service table registration request packet 145 shown in FIG. 24.

Upon receiving the service subscription request message 144, the application server 40-1 sends a user subscribed service table registration request packet 145 shown in FIG. 25 to the subscriber management server 20. The payload 203 of the request packet 145 includes a user subscribed service table registration message M45 comprised of the message type 145A indicating that this message is a user subscribed service table registration request, user ID 145B, authentication information (password) 145C, and service ID 145D extracted from the service subscription request message 144.

Upon receiving the user subscribed service table registration request packet 145, the subscriber management server 20 performs user authentication processing (146) on the user ID 145B and authentication information 145C. If there is no problem with the requester user, the subscriber management server 20 registers a new entry indicating the service ID in association with the user ID in the user subscribed service table 26 shown in FIG. 9 (147). If an entry having the same user ID already exists in the user subscribed service table 26, only the service ID is added to the entry.

Figure 26:
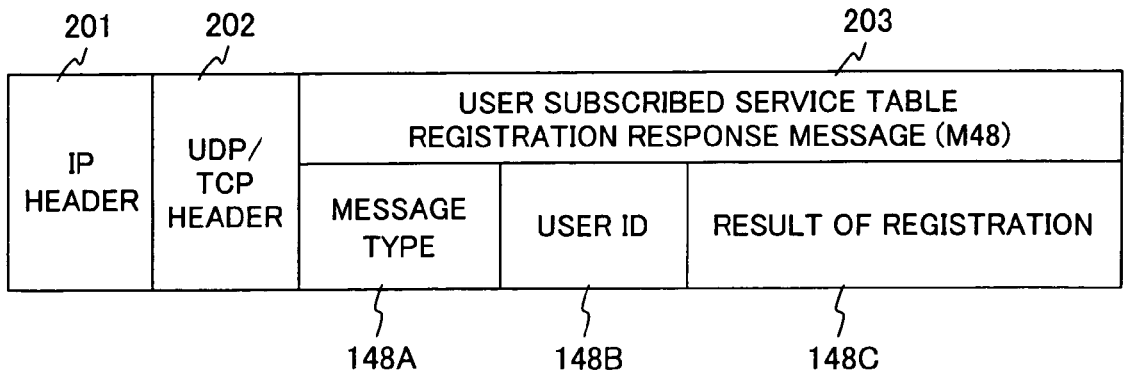
FIG. 26 illustrates the format of a user subscribed service table registration response packet 148 shown in FIG. 24.

Upon completing the registration of the new entry into the table, the subscriber management server 20 sends a user subscribed service table registration response packet 148 shown in FIG. 26 to the application server 40-1. The response packet 148 includes in its payload 203 a user subscribed service table registration response message M48 including the message type 148A indicating that this message is a response to the user subscribed service table registration request, user ID 148B, and authentication result 148C.

Upon receiving the response packet 148 from the subscriber management server 20, the application server 40-1 creates a service subscription response (HTTP reply) packet 149 including the authentication result 146C and sends the packet to the requester client terminal 1-1.

The communication sequences shown in FIGS. 10 and 11 illustrate instances where user authentication and service authorization were successful. However, if the user authentication or service authorization was unsuccessful, the SIP server will send an error message to the requester client terminal and aborts the communication sequence.

While the embodiments have been explained on the assumption that the network system includes the SIP server 10 and the subscriber management server 20 independently, the function of the subscriber management server 20 may be integrated into the SIP server 10 so that the SIP server 10 can execute both user authentication and service authorization. In this case, the user authentication table 25 and the user subscribed service table 26 shown in FIGS. 8 and 9, respectively, are equipped in the memory 13 of the SIP server 10. It becomes unnecessary to communicate the user authentication request packet 103 and authentication response packet 104 as well as the service permission request packet 107 and permission response packet 108 shown in FIG. 10 and the user authentication request packet 121 and authentication response packet 122 shown in FIG. 11. Also, the sequence shown in FIG. 24 is modified so that the user subscribed service table registration request packet 145 issued from the application server 40-1 is sent to the SIP server 10 and the SIP server returns the registration response to the application server 40-1.

As another example of a modification to the described embodiment of the present invention, it may be possible that the subscriber management server 20 still has only the user authentication function and the SIP server 10 is equipped with the user subscribed service table 26, so that the SIP server will execute service authorization. In this case as well, as noted above, the user subscribed service table registration request packet 145 issued from the application server 40-1 is sent to the SIP server 10 and the SIP server returns the registration response to the application server 40-1.

What is claimed is:

1. An information service communication network comprising
a plurality of application servers for providing information services, and
a session management server for selectively carrying out one of a communication procedure to establish a session between one of client terminals and one of said application servers and a communication procedure to disconnect the session in response to a request from the client terminal,
wherein at least one of said application servers is capable of providing different kinds of information services having different service identifiers which identify said information services provided by said one of said application servers, and said session management server is effected at least in part by a hardware processor and includes:
a service determination table comprising a plurality of entries each indicating a relation between particular information items to be extracted from each of session setup request packets and a service identifier,
said particular information items including at least a request method,
a Uniform Resource Identifier (URI) assigned to a destination application server and a content type, and
at least two entries of said service determination table including different service identifiers in association with the same URI; and a processor for determining, when a session setup request packet issued from one of said client terminals to a particular application server was received, whether the client terminal is authorized to receive an information service to be provided by the particular application server, in place of the particular application server, determining an address of the particular application server based on a URI extracted from the session setup request packet when the determination resulted in success, and forwarding the session setup request to the particular application server by using the address, wherein said processor searches said service determination table based on the particular information items extracted from the session setup request packet to specify said service identifier corresponding to the particular information items, and verifies if the specified service identifier is set for the user identifier indicated in the session setup request packet to determine whether the client terminal is authorized to receive the information service identified by the specified service identifier, wherein said session setup request packet indicates a SIP message, wherein the request method included in entries of said service determination table indicates a type of the SIP message, and wherein the request method, the URI, and the content type included in the entries of said service determination table, are necessary to specify the service identifier and wherein each of said application servers returns, without executing service authorization processing on the client terminal when the session setup request was received from said session management server, a response packet to the session management server in response to the session setup request.

2. The information service communication network according to claim 1, comprising a subscriber management server for performing user authentication in response to a request from said session management server, wherein said processor of said session management server sends, when said session setup request packet was received from said client terminal, a user authentication request specifying a user identifier and authentication information extracted from the request packet to said subscriber management server, and determines, upon receiving a response indicating that the user identifier was authenticated from said subscriber management server, whether the client terminal is authorized to receive said information service.

3. The information service communication network according to claim 1, wherein said session management server includes a user subscribed service table comprising a plurality of entries each indicating the relation between a user identifier and a service identifier of information service available for a user having the user identifier, and wherein said processor verifies the relation between the user identifier indicated in the session setup request packet and said specified service identifier by referring to said user subscribed service table.

4. The information service communication network according to claim 2, wherein said processor specifies, upon receiving a response indicating that the user identifier was authenticated from said subscriber management server, a service identifier corresponding to the particular information items extracted from the session setup request packet by referring to said service determination table, sends a user subscribed service authorization request designating the user identifier indicated in the request packet and the specified service identifier to said subscriber management server, and forwards the session setup request packet to said particular application server upon receiving a response indicating that the service identifier was authorized from said subscriber management server.

5. The information service communication network according to claim 4, wherein said subscriber management server includes:

a user authentication table comprising a plurality of entries each defining the relation between a user identifier and a password;

a user subscribed service table comprising a plurality of entries each defining the relation between a user identifier and a service identifier of information service available for a user having the user identifier; and a processor for determining, upon receiving said user authentication request specifying the user identifier and authentication information from said session management server, whether the authentication information is valid based on the password registered in said user authentication table to return a response indicating the result of the determination to said session management server, and verifying, upon receiving said user subscribed service authorization request designating the user identifier and the service identifier from said session management server, the relation between the user identifier and the service identifier by referring to said user subscribed service table to return a response indicating the result of the verification to said session management server.

6. The information service communication network according to claim 3, wherein said processor of said session management server starts, when forwarding an acknowledge response packet received from said particular application server to the requester client terminal, collection of session log information in association with the user identifier of said session setup request packet and said specified service identifier.

7. The information service communication network according to claim 6, comprising an accounting server, wherein said processor of said session management server notifies said accounting server of said session log information when said session was disconnected, and each of said application servers starts, when returning said acknowledge response packet, collection of application log information on the requester of said session setup, and notifies said accounting server of said application log information when said session was disconnected.

8. A session management server for selectively carrying out one of a communication procedure for establishing a session between one of client terminals and one of application servers connected to a communication network and a communication procedure for disconnecting the session, at least one of said application servers being capable of providing different kinds of information services having different service identifiers which identify said information services provided by said one of said application servers and said session management server being effected at least in part by a hardware processor and comprising:

a service determination table comprising a plurality of entries each indicating the relation between particular information items to be extracted from each of session
setup request packets and a service identifier,
said particular information items including at least a
request method,
a Uniform Resource Identifier (URI) assigned to a destination application server and a content type, and
at least two entries of said service determination table
including different service identifiers in association with
the same URI; and
a processor for determining, when a session setup request
packet issued from one of said client terminals to a
particular application server was received, whether the
client terminal is authorized to receive an information
service to be provided by the particular application
server, in place of the particular application server,
determining an address of the particular application server
based on a URI extracted from the session setup request
packet when the determination resulted in success, and
forwarding the session setup request packet to said particular application server by using the address,
wherein said processor searches said service determination
table based on the particular information items extracted
from the session setup request packet to specify said
service identifier corresponding to the particular information items, and verifies if the specified service identifier is set for the user identifier indicated in the session
setup request packet to determine whether the client
terminal is authorized to receive the information service
identified by the specified service identifier,
wherein said session setup request packet indicates a SIP
message,
wherein the request method included in entries of said
service determination table indicates a type of the SIP
message, and
wherein the request method, the URI, and the content type
included in the entries of said service determination
table, are necessary to specify the service identifier.

9. The session management server according to claim 8,
comprising:
a user subscribed service table comprising a plurality of
entries each defining a relation between a user identifier
and a service identifier of information service available
for a user having the user identifier;
wherein said processor sends, when said session setup
request packet was received from said client terminal, a
user authentication request designating a user identifier
and authentication information extracted from the
request packet to a subscriber management server connected to said communication network, specifies, upon
receiving a response indicating that the user identifier
was authenticated from said subscriber management
server, a service identifier corresponding to the particular information items extracted from the session setup
request packet by referring to said service determination
table, and verifies the relation between the user identifier
indicated in the session setup request packet and the
specified service identifier by referring to said user subscribed service table, thereby to determine whether the
client terminal is authorized to receive an information
service corresponding to the specified service identifier
from said particular application server.

10. The session management server according to claim 8,
wherein said processor sends, when said session setup
request packet was received from said client terminal, a
user authentication request designating a user identifier
and authentication information extracted from the
request packet to a subscriber management server connected to said communication network, specifies, upon
receiving a response indicating that the user identifier
was authenticated from said subscriber management
server, a service identifier corresponding to the particular information items extracted from the session setup
request packet by referring to said service determination
table and sends a user subscribed service authorization
request designating the user identifier indicated in the
session setup request packet and the specified service
identifier to said subscriber management server,
wherein, said session setup request packet is forwarded to
said particular application server when a response indicating that the service identifier was authorized is
received from said subscriber management server.

11. The session management server according to claim 9,
wherein said processor starts collection of session log
information in association with the user identifier of said
session setup request packet and said specified service
identifier, when forwarding an acknowledge response
packet, which was issued in response to said session
setup request packet by said particular application
server, to the requester client terminal, and notifies an
accounting server connected to said network of said
session log information when said session was disconnected.

12. The session management server according to claim 10,
wherein said processor starts collection of session log
information in association with the user identifier of said
session setup request packet and said specified service
identifier, when forwarding an acknowledge response
packet, which was issued in response to said session
setup request packet by said particular application
server, to the requester client terminal, and notifies an
accounting server connected to said network of said
session log information when said session was disconnected.

* * * * *